United States Patent

[11] 3,618,917

| [72] | Inventors | Bengt Fredrikson<br>Vasteras;<br>Sven Hellsing, Finspong; Kare Folgero,<br>Vasteras, all of Sweden |
|---|---|---|
| [21] | Appl. No. | 9,705 |
| [22] | Filed | Feb. 9, 1970 |
| [45] | Patented | Nov. 9, 1971 |
| [73] | Assignee | Allmanna Svenska Elektriska Aktiebolaget<br>Vasteras, Sweden |
| [32] | Priority | Feb. 20, 1969 |
| [33] | | Sweden |
| [31] | | 2340/69 |

[54] CHANNEL-TYPE INDUCTION FURNACE
9 Claims, 3 Drawing Figs.

[52] U.S. Cl. .................................................. 266/34 A,
13/29, 13/30, 266/34 T
[51] Int. Cl. .................................................. C21c 7/00

[50] Field of Search ............................................ 266/24, 33
R, 34 R, 34 A, 34 T, 34 PP, 34 PT; 13/26, 28, 29,
30

[56] References Cited
UNITED STATES PATENTS
3,192,303  6/1965  Olsson........................  13/34

Primary Examiner—Gerald A. Dost
Attorney—Jennings Bailey, Jr.

ABSTRACT: A channel-type induction furnace has one or more inductors, a bottom channel beneath the inductor or inductors and side channels connecting the bottom channel to the hearth. In the case of more than one inductor, there is also at least one central channel running between the inductors. Nozzles are provided openings into the bottom channel opposite the side and central channels for the supply of inert and/or active gas into the channels to modify the flow therein and to carry to the top of the melt various impurities.

PATENTED NOV 9 1971 3,618,917

INVENTOR
BENGT FREDRIKSON
KARE FOLGERO
BY SVEN HELSING
Jenny Bailey, ATTORNEY

CHANNEL-TYPE INDUCTION FURNACE

BACKGROUND OF THE INVENTION

1. Field of the Invention

The present invention relates to a channel-type induction furnace having at least one inductor. In such an inductor there are usually at least two side channels made of ceramic material leading from the common furnace hearth and one bottom channel which joins the parts of the side channels facing away from the hearth. There may also be a central channel facing away from the hearth. There may also be a central channel leading from the bottom channel to the furnace hearth. In the first case the channels surround a primary winding and in the latter case two windings are surrounded. The channel-type induction furnace in the present case is specifically intended for melting or keeping warm aluminum or magnesium or alloys of either of these metals, and the winding(s) is fed with low frequency.

The invention may also be used for two by two by one-phase channels or three-phase channels having five and four vertical channels, respectively, joined by bottom channels.

2. The Prior Art

Such melting or heat retaining is normally used in the manufacture of semimanufactured products such as sheet metal, metal rod material, tubes, etc. of light metal. Low-frequency channel-type induction furnaces are used to remelt scrap metal from rolling mills and pressing plants and return-scrap from customers of the semimanufacturer. Ingots or billets are cast from the scrap material. These billets, etc. are cast in semicontinuous or continuous casting machines. Continuous casting of wide endless strips is also carried out and these are rolled to dimensions suitably for further reduction, for example to Al-foil.

The return-scrap material may mostly consist of pure aluminum, with some aluminum alloys sorted after analysis. Certain alloying elements such as silicon, magnesium, manganese, copper, chromium, zinc, lead, iron and titanium must of course be added to the melt as hardening components. A low-frequency channel-type induction furnace may also be used for the manufacture of such hardening components. Such furnaces are also used for the manufacture of aluminum, for example for casting rolled billets and ingots. Another field of application for such furnaces is melting and heat retaining in die-casting foundries where the raw material consists of aluminum or Al-alloys in the form of ingots.

One of the problems with melting, and also with heat retaining, of Al, Al-alloys, Mg, Mg-alloys, etc. is that metal oxides are deposited on the walls of the melt-channels of the inductor, and this gradually reduces the cross section of the channels to such an extent that the furnace operation is impeded and, when the channels are completely block operation is impossible. In order to enable cleaning of the melt channels these are given straight parts, usually vertical, which are accessible to cleaning tools inserted through the furnace trough even when there is melt in this. There is usually also a horizontal bottom channel which is joined to the vertical pieces (side and possibly central channels). Cleaning tools can be inserted in the bottom channel through holes in the sides of the inductor, these being normally closed with removable plugs. Of course the bottom channel can only be cleaned when the furnace has been emptied. Furnaces of this type are known, see for example Swedish Pats. No. 96,536, and 98,312. One disadvantage with such furnaces is that the vertical channels must be cleaned often, usually after each melting operation or charge. With melts containing, for example magnesium, cleaning must even be carried out during a melting operation. The bottom channel must normally be cleaned once a week with substantially constant operation, in the latter case when the furnace has been emptied. Cleaning may be carried out when the furnace is empty by means of tools driven by compressed air which are inserted in all the different channels. These tools may be rotating, similar to rock drills, and provided with hard metal tips. These and other similar disadvantages mean that furnaces of this type cannot easily, or not at all, be used for chip-melting, melting of alloys with high magnesium and/or silicon content, melting of certain hardening components, etc. Furthermore, because of the cleaning problem such furnaces have only been used to a limited extent for continuous casting.

The cleaning process becomes more and more difficult as the furnace is used. How quickly it becomes clogged depends on the composition of the melt, but after a certain time the furnace must be taken out of operation and the inductors relined. The inductor may possibly be exchanged, but even with such inductors relining must be carried out. Neither is it certain that the deposits occur substantially uniformly along the various part-channels, but such collections of oxides, slag and the like may also occur periodically and cause local overheating which may cause the melt to penetrate through the lining and result in a breakdown of the furnace. The cleaning process also causes considerable wear on the ceramic lining material, such as crack-formation and erosion and this also shortens the life of the lining.

The various collections of deposits also cause decreased furnace capacity and disturbances in operation in the form of interruptions in the secondary circuit formed by the melt in the inductors and, for instance, the pinch-effect limit may be reached when the area of the channels becomes too small. Various solutions have been tried, such as the use of different types of material for the lining, for instance material which does not react with or become soaked by aluminum or the alloying element used. Both monolithic material and ready-sintered shaped brick have been tried in the channels. It has also been tried to reduce the appearance of oxide formations on the channels walls by preimpregnating these with cooking salt and the like.

Increasing the area of the channels in inductors with high-melt capacity has also been tried, but this considerably increases the cost of the equipment, partly due to the need for larger capacitor banks because of the increased reactive effect.

None of these attempts has been given any definite solution of the problem of deposits.

So-called one-way bath movement has also been tried by various shaping the channels in order to prevent the occurrence of deposits. However, this has not been entirely successful either and all these problems have limited the possibility of meeting the ever-increasing demand for melting furnaces with high capacity. As an example of the practical limit for the size of an inductor unit of so-called W-channel type (one center channel, two side channels) may be mentioned above 400 kw., but there is a demand for much greater power.

One-way bath movement has also been successfully achieved by blowing inert gas in the vicinity of a channel opening or in the channel itself, and this has at least in steel melts prevented local overheating, but this method has not solved the problem for melts containing, for instance aluminum or magnesium.

SUMMARY OF THE INVENTION

These and other similar problems are solved by the channel-type induction furnace according to the invention which is characterized in that at least one nozzle is arranged in the bottom channel below each side and central channel to blow in gas such as inert gas and possibly a gas which reacts with parts of the furnace contents. By means of this arrangement it is possible, by varying gas quantities in the different nozzles, to regulate the melt circulation in the inductor so that one-one bath movement is obtained, with resultant temperature equalization. Furthermore, gas bubbles rise in all the substantially vertical channels and move in the bottom channel and the particles which would normally deposit themselves on the channel walls in the use of such furnaces for melts containing Al and Mg (and also other types of melts) will be deposited around these bubbles and go with them to the surface of the melt where they can easily be removed (flotation effect).

With an inductor having W-shaped channels (two side and one central channel and a bottom channel) a weaker gas flow can, for example, be arranged in the central channel so that the melt flows toward the hearth in the side channels, but this circulation pattern can easily be altered by altering the gas flow. Flotation effect is obtained in all the channels and depositing is prevented.

A slag-free surface is thus obtained in the core, over the channel openings or the opening in the center or, with one-way circulation, over the channel with upwardly directed flow. Here gas, such as liberated hydrogen, may leave without being impeded by or reacting with the slag.

By also introducing active gas, such as chlorine gas, into the channels oxides, for example, can be reduced to form chlorides which rise in the form of slag or scum to the surface of the bath. The desired refining of the melt can also be effected in the same way. This eliminates the necessity of lance immersion and blowing gas into the channels or powder processes, for example for the addition of chlorine. The addition of active gas may possibly be reduced or even completely eliminated if the flotation effect gives 100 percent result and all oxide pockets and the like have disappeared, but the addition of active gas is sometimes a good supplement to the addition of inert gas.

BRIEF DESCRIPTION OF THE DRAWINGS

These and other advantages of the invention will become clearer in the following with respect to the description of the accompanying drawings in which.

DESCRIPTION OF THE PREFERRED EMBODIMENTS

Figure 1:
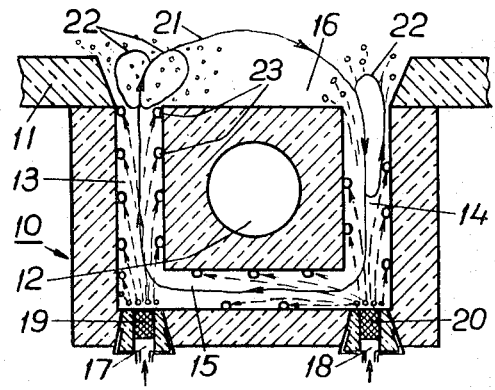
FIG. 1 shows a section through a channel-type induction furnace having a single-channel inductor, FIG. 2 a section through a channel-type induction furnace having double channels (W-channel) of rounded type and FIG. 3 the same thing with straight vertical channels.

FIG. 1 shows an inductor 10, removably attached to a furnace trough (core part) 11, and provided with a central winding 12 fed with low frequency and two side channels 13, 14 connecting a bottom channel 15 to the furnace hearth 16. In the bottom channel 15 close to the side channels 13, 14 are gas nozzles 17, 18 provided with porous plugs 19, 20 to permit gas flow and control of the gas flow (not shown in FIG. 1). Inert gas (argon, nitrogen or other gas) is primarily blown in through these nozzles and a considerably greater quantity of gas is allowed through nozzle 17 than through nozzle 18 so that a one-way bath movement is obtained in the melt in the inductor in the direction of the arrow 21. This bath movement is initiated before current is supplied to the coil 12 and the conventional flow with closed circulation system within the various side channels is altered. The flow around the channel openings is obtained according to the arrows 22 at the transition from small area in the side channels 13, 14 to large area in the core 16, but this is not changed in the final flow character of one-way bath movement according to the arrow 21.

Previously, in order to attain a minimum of gas and oxide pockets in the melt, when the change (for example containing aluminum) is melted and the casting temperature is achieved, degassing was carried out by immersing a suitable powder, for example hexachloroethane, into the melt, and possibly chlorine gas blown into the melt through an immersion lance and the degassing and cleaning effect is obtained through flotation. However, this is a separate procedure which takes time and it can be completely or partly eliminated by means of the present invention and certain extra arrangements.

The arrangement described above in connection with FIG. 1 provides through-rinsing of the channels (see the broken arrows in FIG. 1) and a degassing and temperature-equalizing effect is obtained in the channels. By simultaneously flushing active gas, such as chlorine, through the nozzles (or in some other place) a further cleansing (refining) effect is obtained in the melt which contains aluminum, magnesium or similar metals.

Since the gas is finely distributed in the melt channel and thrown out into the trough (core 16) together with the flow from the inductor and passes through the inductor nozzle (see at the arrows 22) and its countercurrents and also passes zones in the nozzle which function as diverging nozzles, a good distribution of the gas is obtained throughout the entire melt and gas bubbles on their way up through the melt to the surface of the bath are forced to pass great quantities of melt (the reaction time is increased) which is not the case to the same extent when gas is blown into a stationary melt. Compared with conventional methods larger numbers of small gas bubbles are obtained for the same quantity of gas, which gives a considerably increased reaction surface which in turn contributes to more effective hydrogen purification (out of the melt) and more favorable flotation effect. Thus a more favorable metallurgical result is obtained with a smaller quantity of gas and the necessity of the separate degassing procedure before the casting is partly or completely avoided.

As can be seen in FIG. 1 the various particles 23 which would otherwise be deposited on the walls of the channel rise in the melt and are collected at the surface when the gas leaves.

The means according to FIG. 1 may be supplemented by an evacuation level to further cleanse the melt in the furnace and remove poisonous and corroding gases from the trough.

Figure 3:
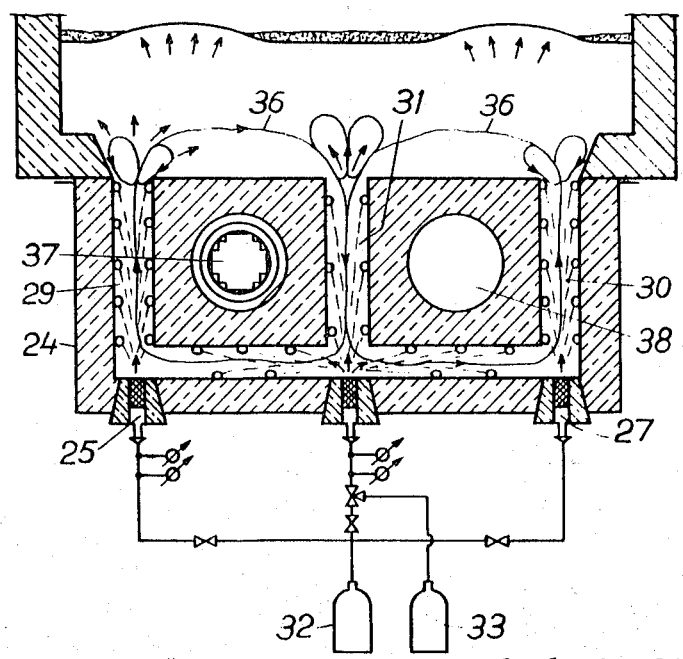

FIG. 3 shows a furnace having one (or more) W-inductors 24, possibly replaceable. In this case three nozzles 25, 26, 27 with porous plugs are applied in the bottom channel 28, directed towards the two side channels 29, 30 and the central channel 31. Through these nozzles can be blown inert gas 32 (argon) and active gas 33 (refining gas) into the channels, the latter gas being preferably blown in after the end of the melting period. By means of valve members in the gas conduit, the gas pressure in the various nozzles and the distribution of the various gases can be suitably adjusted. Possibly pressure gauges and flow gauges 34, 35 may be arranged near the gas nozzles, possibly with pressure-regulating means (not shown).

In the case according to FIG. 3 a small quantity of gas is blown into the central channel 31 and larger quantities of gas in the side channels, first inert gas, and after the melting period an active gas may be blown in. In certain cases it may be suitable to blow in the active gas at the same time as the inert gas. A circulating direction according to the arrows 36 is obtained about the low-frequency one or two phase windings 37, 38.

The degassing and cleaning processes according to the above may be varied in many ways and it is advantageous to concentrate the chlorine gas treatment (reduction of aluminium-oxide particles) in the final phase of the treatment. A means in accordance with FIG. 1 or FIG. 3 enables the mechanical cleaning and the need for lance or powder addition can be completely or partly eliminated. It has been found that with an arrangement in accordance with FIG. 3 a considerable amount of time can be saved which was previously taken up in cleaning the channels. The "dead period" for degassing and cleaning disappears. Replacement of alloys takes place rapidly—it is not necessary to shut down the furnace for cleaning before exchanging alloys.

Figure 2:
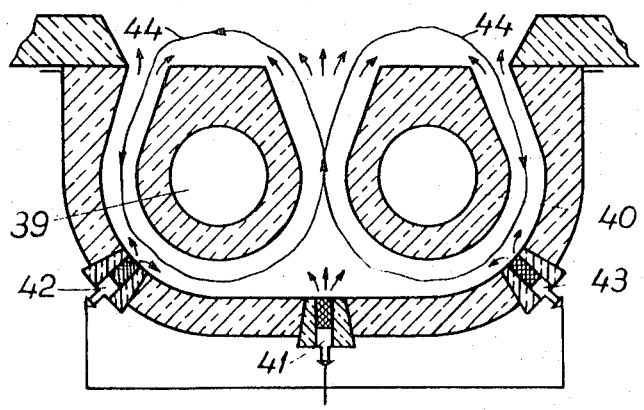

The inductor in the channel-type induction furnace according to the invention need not necessarily have melt channels with straight parts, but the channel may be designed in a manner normal for heavy metal channel-type induction furnaces, that is, permit the shape of the channel to fit the shape of the circular primary winding (see 39, 40, FIG. 2), which considerably improves the electric properties of the inductor. An inductor according to FIG. 2 may thus be constructed for greater power than other types of inductors, the active effect is increased and the reactive effect is decreased with such a design for the channel. FIG. 2 shows how, with a stronger gas flow in the central nozzle 41 than in the nozzles (42, 43) situated near the side channels, the melt circulation can be guided upwardly in the center and downwardly in the outer channels (see arrow 44).

If desired the circulation direction can be reversed. By means of suitable adjustment of the quantity of gas allowed through the individual plugs a considerably lower temperature is obtained in the melt channel than has been previously possible. The one-way bath movement also means that the power density in the melt channel can be increased without the pinch-effect limit being exceeded.

The power density in the channel can thus be increased, which is necessary if inductors with high-melt capacity are to be constructed.

In furnaces having four vertical channels it is possible to guide the flow pattern and speed so that downward flow is obtained in the two center or the two left-hand or the two right-hand channels and opposite flow in the others. In furnaces having five channels downwardly directed flow can be effected in the two outer and the central channel and upwardly directed flow in the others, or vice versa. The pattern can be varied in many ways by controlling the relation between the different gas quantities.

As seen, in all the embodiments shown all parts of the inductor channels can be reached with the gas flushing and by means of flotation effect the deposits on the channel walls can be entirely or to a great extent prevented. By the addition of extra active gas the quantities of oxides and undesirable metals can be reduced. The invention in accordance with the above can be varied in many ways within the scope of the following claims.

We claim:

1. Channel-type induction furnace having at least one inductor, comprising at least two side channels leading from the furnace hearth and one bottom channel joining the parts of the side channels facing away from the hearth, gas supply means comprising at least one nozzle located under each side channel to blow in gas.

2. Channel-type induction furnace according to claim 1, in which the gas supply means includes means to supply to the nozzle an inert gas and a gas which reacts with parts of the furnace contents.

3. Channel-type induction furnace according to claim 1, in which said gas nozzle comprises a porous body to allow gas to pass through into the melt channels.

4. Channel-type induction furnace according to claim 1, in which the gas supply means includes at least two nozzles opening into different parts of the bottom channel, and adjustable means to allow a greater or smaller gas quantity to flow to one part of the bottom channel than to another part of said channel in order to effect uniform bath movement and gas flow in all parts of the channel.

5. Channel-type induction furnace according to claim 1, in which the number of channels between the bottom channel and the hearth is three and the gas supply means comprises a middle gas nozzle directed in the longitudinal direction of the middle channel.

6. Channel-type induction furnace having at least one inductor comprising at least two side channels and at least one central channel leading from the furnace hearth and one bottom channel joining the parts of said channels facing away from the hearth, at least one nozzle arranged under said central channel in said bottom channel for gas-flow into said central channel, and a nozzle arranged under each of said side channels for gas flow into the last-mentioned channels.

7. Channel-type induction furnace according to claim 6, in which the flow towards the central channel is greater than the flow against the side channels in order to obtain a bath movement directed substantially from the hearth in the central channel and a bath movement substantially towards the hearth in the outer channels.

8. Channel-type induction furnace according to claim 6, in which the flow towards the central channel is smaller than the flow towards the side channels in order to obtain a bath movement directed substantially towards the hearth in the central channel and substantially away from the hearth in the side channels.

9. Channel-type induction furnace in accordance with claim 6, in which the number of central channels is at least two, at least one nozzle being arranged in the bottom channel opposite each side and central channel, each inlet being adjustable in order to obtain a desired flow pattern.

* * * * *